US006237531B1

United States Patent
Peeples et al.

(12) United States Patent
(10) Patent No.: US 6,237,531 B1
(45) Date of Patent: May 29, 2001

(54) PET BED WITH HEATING AND COOLING FEATURE

(75) Inventors: Kathleen G. Peeples, Houston, TX (US); Joseph F. Fiore, Lebanon, PA (US)

(73) Assignee: Igloo Products Corp., Houston, TX (US)

(*) Notice: Subject to any disclaimer, the term of this patent is extended or adjusted under 35 U.S.C. 154(b) by 0 days.

(21) Appl. No.: 09/332,309

(22) Filed: Jun. 14, 1999

(51) Int. Cl.[7] ...................................................... A01K 29/00
(52) U.S. Cl. ........................................... 119/28.5; D30/118
(58) Field of Search .................................. 119/28.5, 171, 119/526; D30/118; 5/473; 114/131

(56) References Cited

U.S. PATENT DOCUMENTS

| | | | |
|---|---|---|---|
| D. 135,242 | * 3/1943 | Meyer .................................. | 119/28.5 |
| 3,902,456 | * 9/1975 | David .................................. | 119/28.5 |
| 4,064,835 | 12/1977 | Rabenbauer . | |
| 4,234,780 | 11/1980 | McCarthy . | |
| 4,332,214 | 6/1982 | Cunningham . | |
| 4,591,694 | 5/1986 | Phillips . | |
| 4,688,281 | * 8/1987 | Lantz ....................................... | 5/111 |
| 4,827,872 | 5/1989 | Sommers . | |
| 4,860,689 | * 8/1989 | Stewart ................................ | 119/28.5 |
| 4,899,693 | 2/1990 | Arnold . | |
| 5,197,411 | * 3/1993 | Schwarzenbart ..................... | 119/28.5 |
| 5,265,558 | * 11/1993 | Schonrock .......................... | 119/28.5 |
| 5,311,837 | * 5/1994 | Mamer-Boellstorff .............. | 119/28.5 |
| 5,448,109 | 9/1995 | Cauchy . | |
| 5,685,258 | * 11/1997 | Fricano ................................ | 119/28.5 |
| 5,765,502 | * 6/1998 | Haugh ................................. | 119/28.5 |
| 5,784,995 | * 7/1998 | Willinger ............................ | 119/28.5 |
| 5,826,537 | * 10/1998 | Heilborn .............................. | 119/28.5 |
| 6,038,991 | * 3/2000 | Nelson ................................. | 114/131 |
| 6,084,209 | * 7/2000 | Reusche et al. ..................... | 219/217 |

FOREIGN PATENT DOCUMENTS

2030437 * 9/1978 (GB) .
2211387 * 7/1989 (GB) .

OTHER PUBLICATIONS www.tellurex.com, An Introduction to Thermoelectrics, 7 pages.
www.tellurex.com, Frequently Asked Questions (regarding Advanced Thermoelectric Cooling) 30 pages.
"An Introduction To Thermoelectrics".
"Tellurex Corporation Frequently Asked Questions".

* cited by examiner

Primary Examiner—Charles T. Jordan
Assistant Examiner—Judith A. Nelson
(74) Attorney, Agent, or Firm—Duane, Morris & Heckscher LLP

(57) ABSTRACT

A lightweight, portable pet bed is described. It features an open structure with a hollow ring around its periphery. This ring can trap air which provides a thermal barrier for the pet. A thermoelectric unit is mounted to its underside with appropriate ducting for air circulation so that, depending on the electrical connection, heating or cooling is provided to a sink which is integral with the platform in the pet bed. The pet bed can also provide holes in the platform to secure an appropriate mat for the pet to lay on and to cover the sink which forms a part of the platform. A host of shapes are contemplated, including rectangular, round, oval, and the like. The thermoelectric or other heating or cooling unit can be manually controlled or thermostatically controlled. The units are stackable for easy storage or for shipping or display.

18 Claims, 7 Drawing Sheets

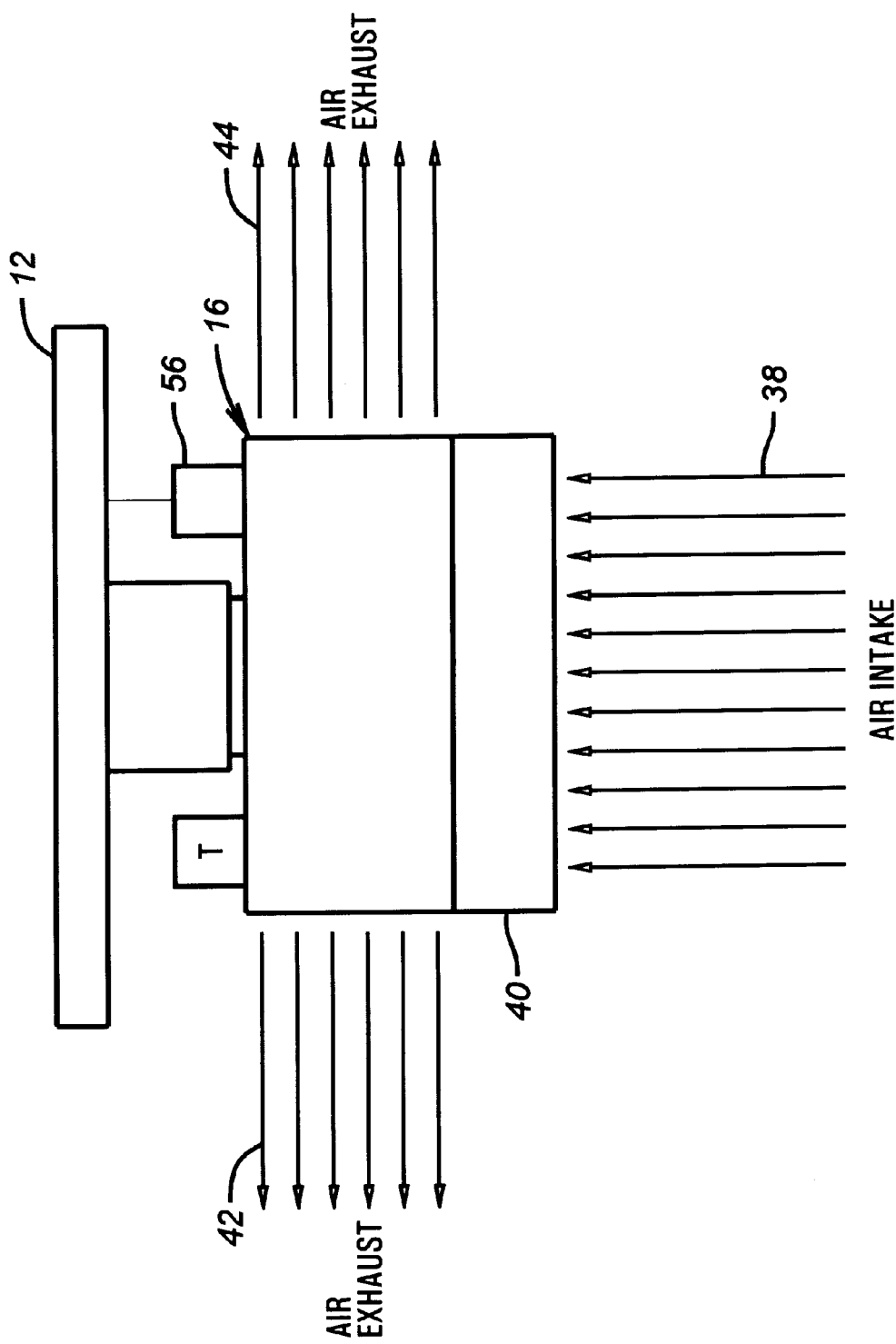

PET BED WITH HEATING AND COOLING FEATURE

FIELD OF THE INVENTION

The field of this invention relates to portable pet beds that have heating and cooling features.

BACKGROUND OF THE INVENTION

In many situations, pet owners find a need to allow their pets to sleep in open environments where no heating or air conditioning facilities are available. For example, some pets are allowed to run in a yard and have free access to an attached or separate garage for shelter from the elements. However, such garage spaces do not have heating or air conditioning facilities normally and, therefore, there exists a need to provide the pet with a place to relax and sleep which is comfortable.

To accomplish the purposes of heating and/or cooling, many attempts in the prior art have resulted in bulky structures that do not work well on a long-term basis. Some of these designs require frequent maintenance. One example of bulky designs which provide heat through a water layer is U.S. Pat. No. 4,591,694. There, a heater of the type used in waterbeds is installed with a thermostat below an enclosure filled with water. The base of the bed that the pet lays on is above the water chamber. The thermostat is set for a certain temperature in the water layer. A cooling concept is illustrated in U.S. Pat. No. 4,064,835 where reusable prefrozen artificial ice packs are installed just below the platform on which the pet sits. The platform has perforations. The operability of such a device is of limited duration unless the pet owner repeatedly replaces the prefrozen chemical ice packs. In a similar vein is U.S. Pat. No. 4,899,693. Here, there is a container which accepts ice cubes. Again, the design requires constant maintenance in order to continue to deliver adequate cooling capacity.

U.S. Pat. No. 4,332,214 illustrates another example, using an electric heater of a coiled shape in a water compartment which surrounds the platform on which the pet would sit or sleep. This design is fairly complex and employs a significant amount of water, making it likely to be fairly slow in sensitivity to changing ambient temperatures. Additionally, the water needs to be changed regularly to avoid growth of algae and the like. Finally, U.S. Pat. No. 4,827,872 is an entire enclosure for an animal with the heating system built into the structure. The assembly is large and heavy, apart from being visually unattractive.

What is desired and lacking in the prior art is a pet bed design which is lightweight and, therefore, portable. In addition to being lightweight, the design should deliver heating and/or cooling in an efficient manner for the pet. Another objective of the present invention is to also provide a barrier around the periphery of the bed to further help in retention of the thermal effect from the system which provides heating and cooling. Elevating the platform also provides some insulating effect from the air layer below.

In accomplishing these objectives, the pet bed of the present invention can employ a thermoelectric device which can be suitably selectively wired for creation of a heating or cooling effect on the platform of the pet bed. The mechanism for providing the heating and cooling in the pet bed of the present invention can employ the thermoelectric principles known in the prior art and illustrated in U.S. Pat. No. 5,448,109, as well as in literature of known manufacturers of thermoelectric devices such as Tellurex, Marlow and Melchor.

Alternative methods of heating and/or cooling can be used in the present invention through eutectic materials alone or in combination with powered devices. Those and other advantages of the present invention will be more readily understood by those skilled in the art from a review of the detailed description of the preferred embodiment below.

SUMMARY OF THE INVENTION

A lightweight, portable pet bed is described. It features an open structure with a hollow ring around its periphery. This ring can trap air which provides a thermal barrier for the pet. A thermoelectric unit is mounted to its underside with appropriate ducting for air circulation so that, depending on the electrical connection, heating or cooling is provided to a sink which is integral with the platform in the pet bed. The pet bed can also provide holes in the platform to secure an appropriate mat for the pet to lay on and to cover the sink which forms a part of the platform. A host of shapes are contemplated, including rectangular, round, oval, and the like. The thermoelectric or other heating or cooling unit can be manually controlled or thermostatically controlled. The units are stackable for easy storage or for shipping or display.

BRIEF DESCRIPTION OF THE DRAWINGS

FIG. 6 is a schematic view of the thermoelectric unit, showing its bottom air intake and lateral air exhaust passages, as well as the sink which forms a part of the platform in the pet bed.

DETAILED DESCRIPTION OF THE PREFERRED EMBODIMENT

Figure 1:
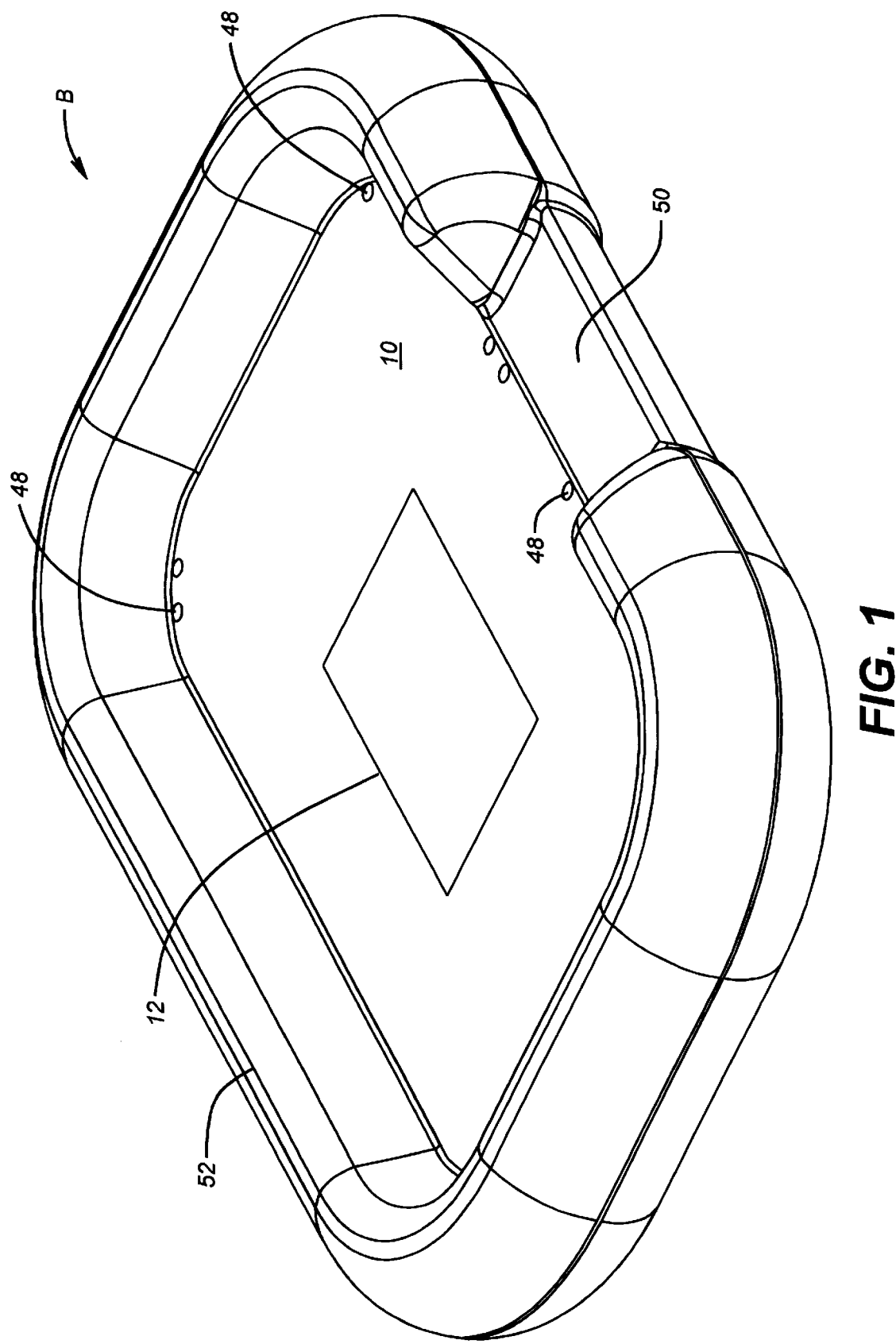
FIG. 1 is a perspective view of a rectangular version of the present invention.
Figure 2:
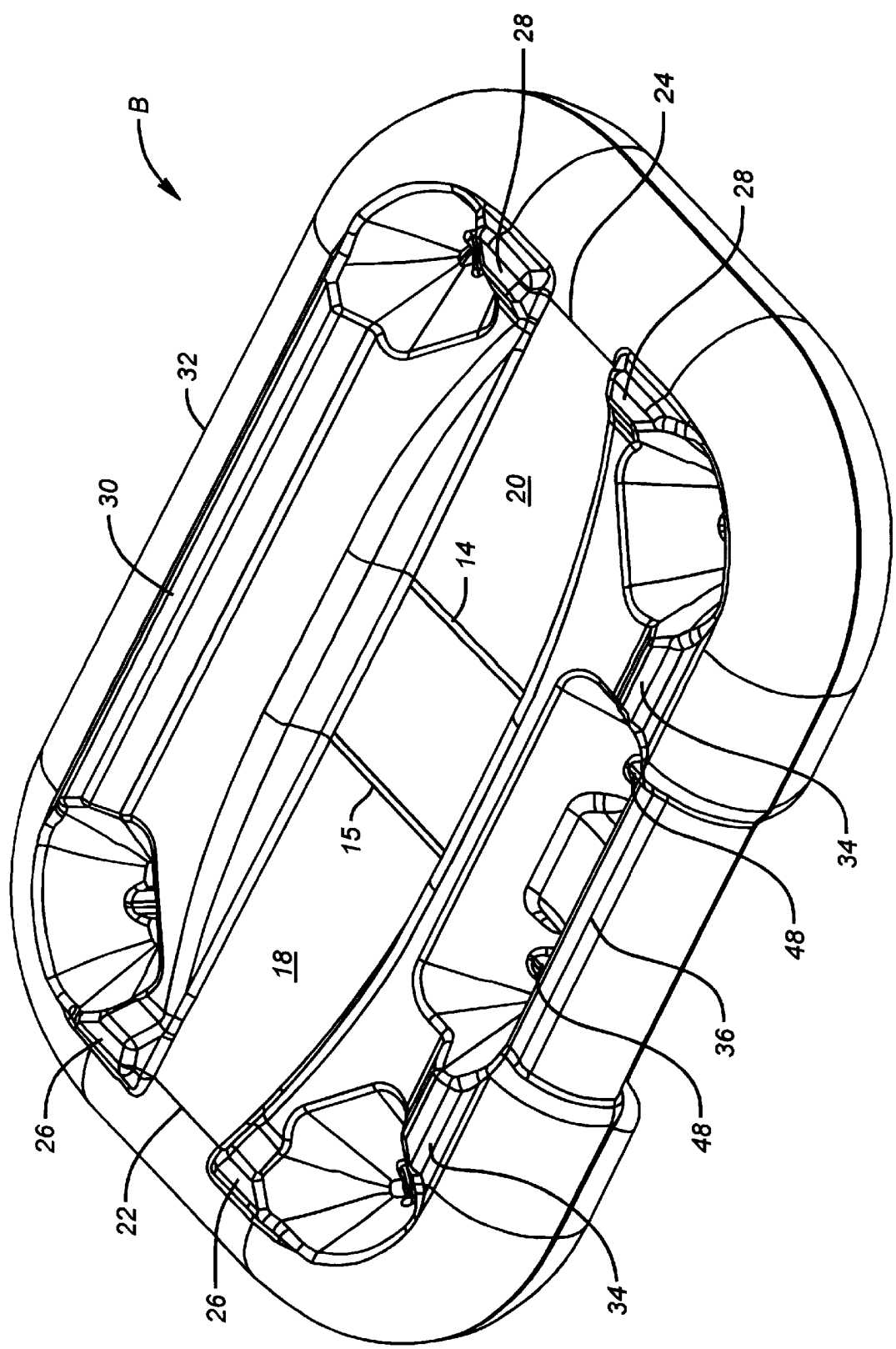
FIG. 2 is a perspective view of the rectangular pet bed, looking at the underside without the thermoelectric unit in place.
Figure 2A:
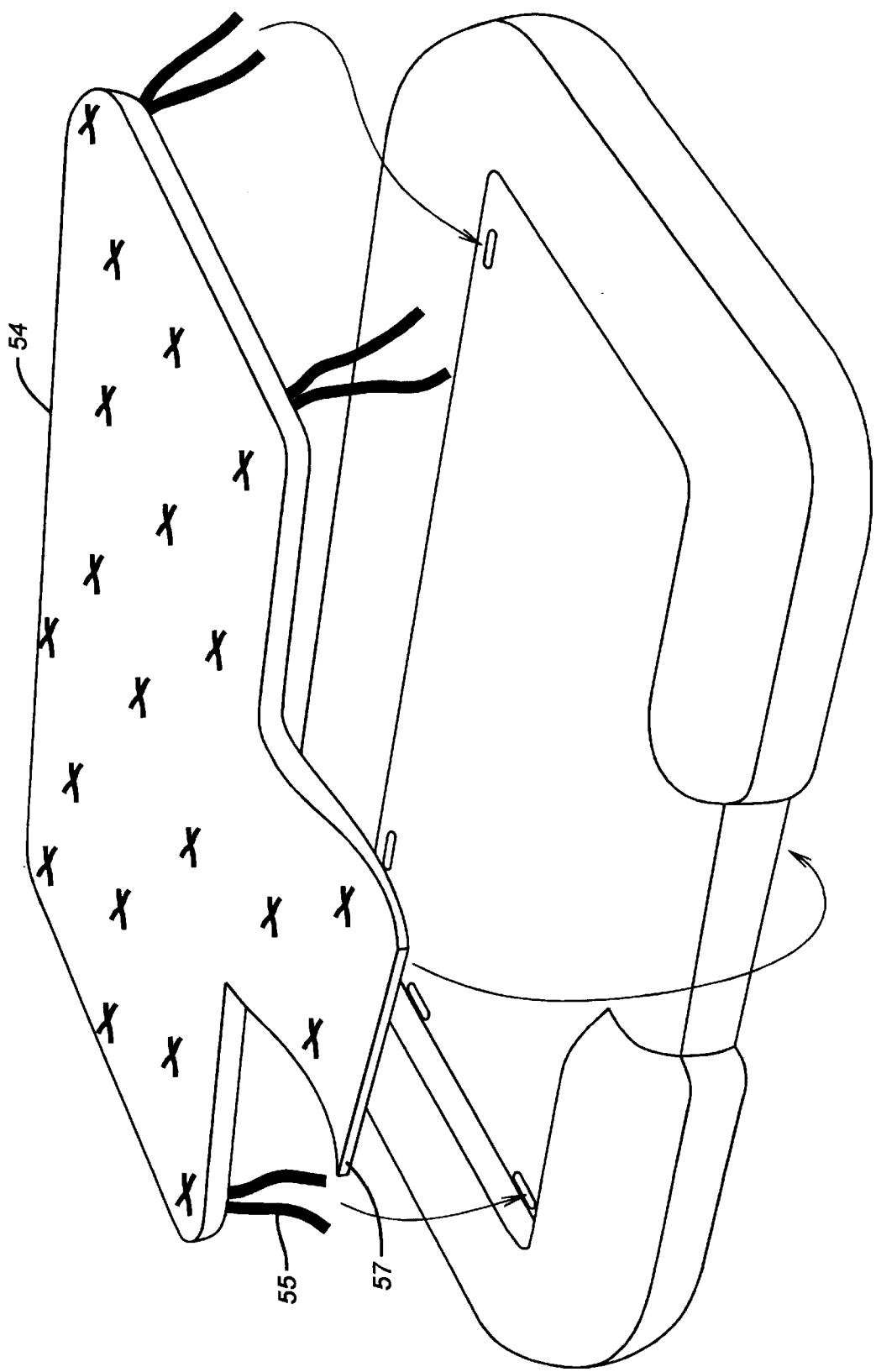
FIG. 2a is a perspective of the top of the bed showing how a pad is attached.

Referring to FIG. 1, the pet bed B is illustrated in perspective view. It has a platform 10, which further includes a plate 12 which covers an opening 14 (see FIG. 2). FIG. 2 illustrates a bottom perspective view with the thermoelectric unit 16 (see FIG. 6) omitted. The underside illustrated in FIG. 2 comprises opposed flow channels 18 and 20. Flow channels 18 and 20 respectively terminate in outlets 22 and 24, which are formed in the underside of the pet bed due to a break respectively in feet 26 and 28. As also shown in FIG. 2, a continuous foot 30 supports the back end 32 of the pet bed B. In the front on the underside, foot 34 is in separated segments, leaving an opening 36 for air intake into the underside of the pet bed B. The air intake flow, represented by arrows 38, is shown schematically in FIG. 6. Referring again to FIG. 6, the thermoelectric unit 16 is of a type well-known in the art and is configured for bottom intake, represented by arrows 38, into a fan 40, with lateral exhausts represented by arrows 42 and 44. The plate 12 illustrated in FIG. 6 forms part of the platform 10 shown in FIG. 1. Depending on the direction of power delivery of DC current, plate 12 absorbs or gives off heat. Exhaust flow represented by arrows 42 and 44, respectively, exits through passages 18 and 20, respectively. A cover 46 is shown in the underside view of FIG. 3. The cover spans the channels 18 and 20 to define closed passages which lead to the exhaust openings 22 and 24, respectively.

Figure 3:
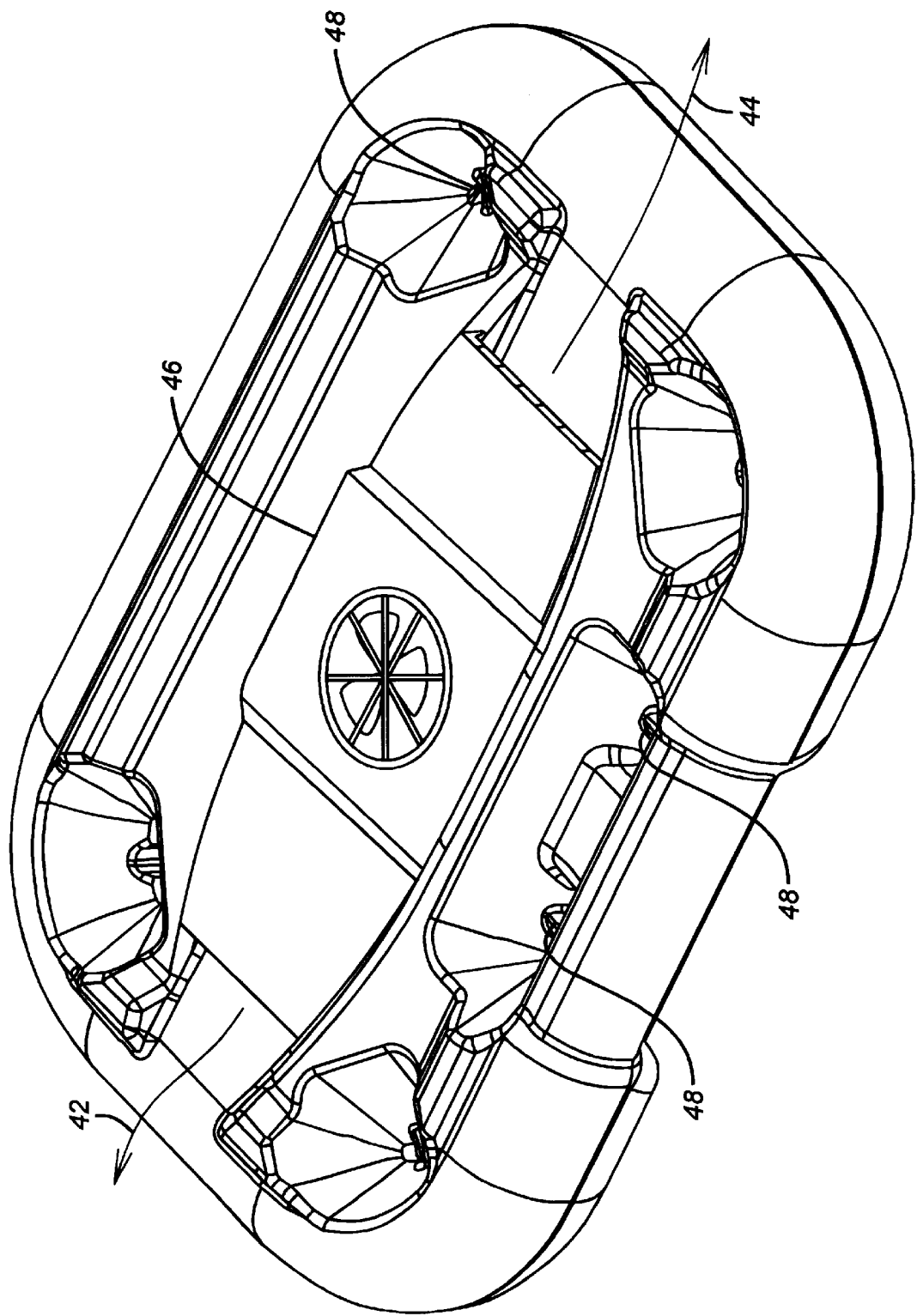
FIG. 3 is the view of FIG. 2, with the thermoelectric unit and cover in place.

As shown in FIG. 1, the platform 10 can have a series of openings 48, preferably disposed in the corners in a rectangular embodiment or equidistant from each other in, for example, a rounded embodiment. FIG. 3 shows an underside view of the openings 48, showing them disposed at the corners as well as adjacent the entrance 50 (see also FIG. 1). Openings 48 allow the mat to be secured to the platform 12.

Another feature of the present invention is the peripheral ring 52 which surrounds the pet bed B apart from the area of the entrance 50. This ring 52 is full of air which is a good insulator. It can be open or sealed. Alternatively, the ring 52 can be injected with foam or other insulators better than air; however, the weight would be increased somewhat.

Figure 4:
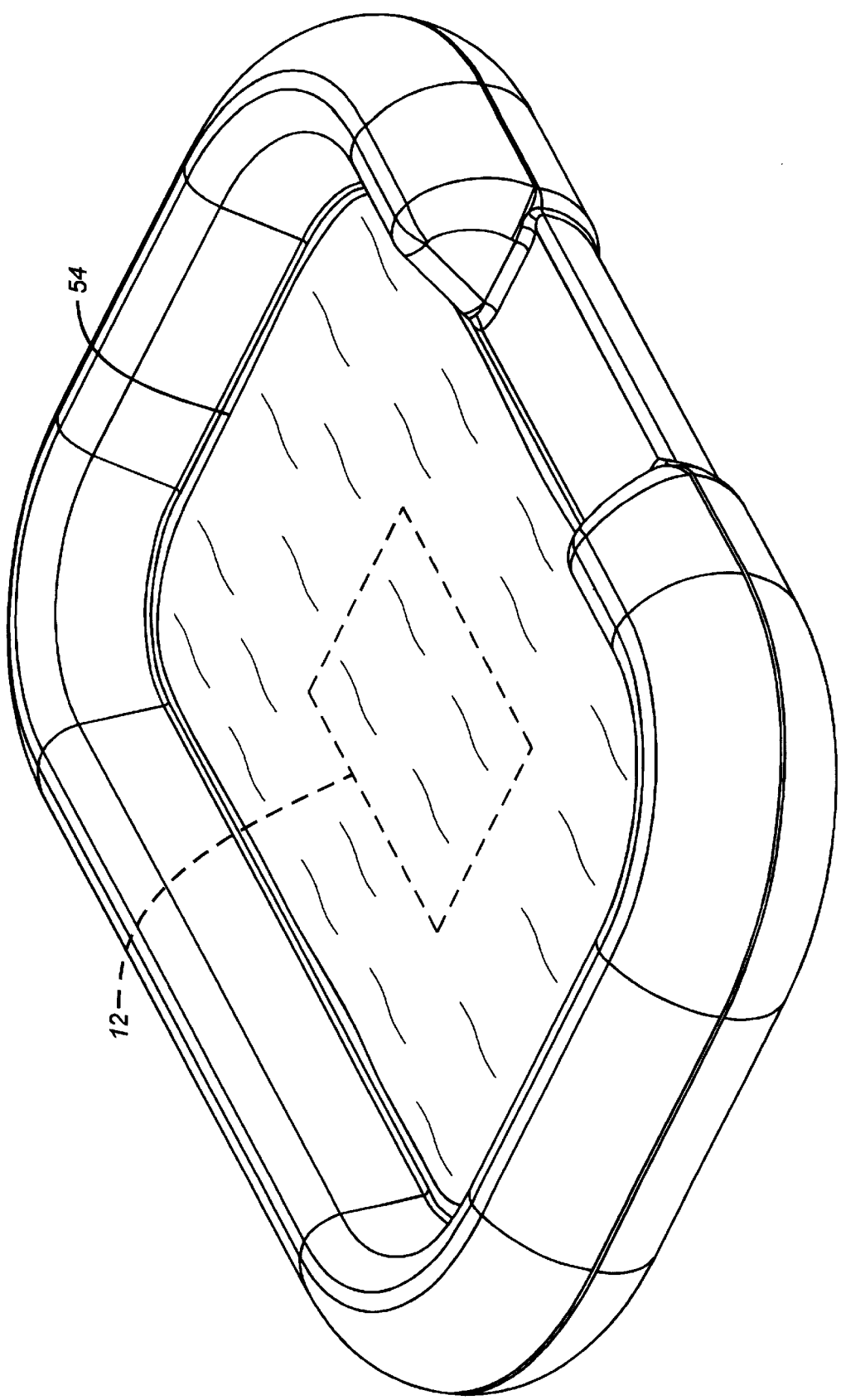
FIG. 4 is similar to FIG. 1 while omitting the openings in the platform to secure a mat.

Referring to FIG. 4, an alternative to the FIG. 1 embodiment is illustrated, with the principal difference being that the openings 48 for tying down a mat 54 are eliminated. As shown in FIG. 4, the plate 12 lies directly below the mat 54. The mat 54 is optional but would generally give greater comfort to the pet than sifting on a rigid platform 10. However, some pets may actually prefer to lay on a rigid platform. In the cooling mode, for example, the plate 12 can be as much as 20–30° F. lower than the ambient temperature. Some pets may find it uncomfortable to lay on the plate 12 directly; hence, the mat 54 which is cut to the shape of the particular pet bed B being used. The be downs 55 are fed through openings 48 and tied on the underside. A tab 57 is also secured to the underside by hook-and-loop or other types of fasteners. The thermoelectric unit 16 will generally include a transformer T which will take ordinary house current at 110 volts AC and convert it to DC current for use with the thermoelectric unit 16. Also shown schematically in FIG. 6 is a thermostat 56 which can work in conjunction with the transformer T for modulation of the power made available to the thermoelectric unit and optionally to switch it from heating to cooling mode in a manner known in the art. Generally speaking, the thermoelectric unit 16 is switched from heating to cooling mode by reversing the power connections applying the voltage to the unit.

Figure 5:
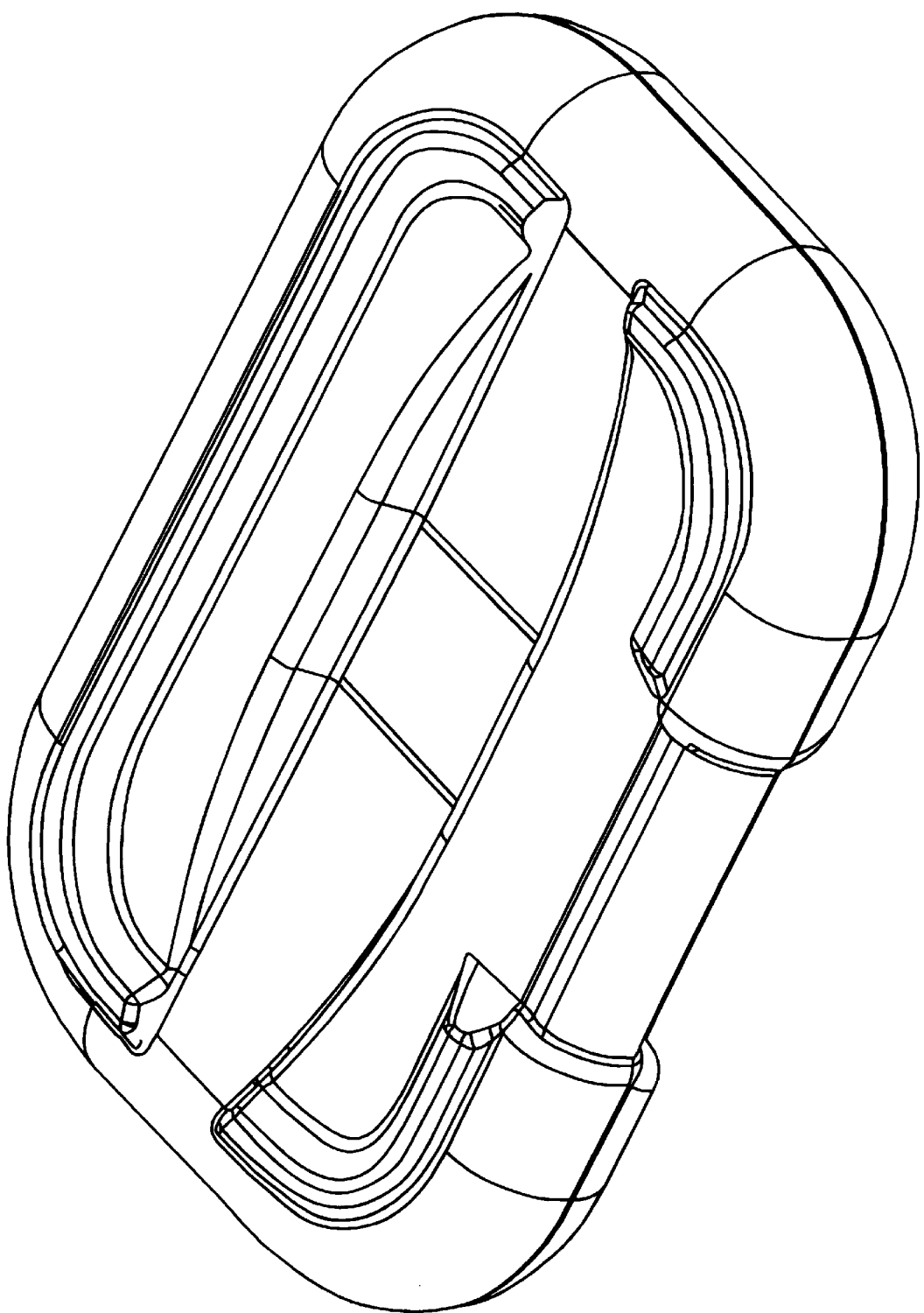
FIG. 5 is an underside perspective view of the embodiment shown in FIG. 4, without the thermoelectric unit.

FIG. 5 is similar to FIG. 2 except that the wells for openings 48 are omitted.

Those skilled in the art will appreciate that the pet bed B can come in a variety of physical sizes, as well as overall shapes. The peripheral ring can be filled with air evacuated or include some other insulating material, such as urethane foam. Elevating the platform 12 provides a layer of insulating air between the pet bed B and the floor or other support. The pet gains or loses heat primarily through its underside. In colder weather, the platform 12 is off a cold slab and vise verse in warm weather. The hollow ring can be air-filled. Some heat from the pet goes into warming this zone that surrounds the pet. The thermoelectric unit 16 can be manually operated or thermostatically operated and can be manually switched from heating to cooling mode or automatically switched. In some embodiments, the pet bed B can be used without the thermoelectric unit or alternative thermal unit 16 and/or without any insulating material in the peripheral ring 52. Optionally, openings 48 in the platform 10 can be provided for securing a mat such as 54 when placed in the embodiment shown in FIG. 1.

The material for the pet bed B itself can be a rigid plastic, which can be provided in a variety of colors. Other materials can be used as long as they result in a general lightweight design.

The foregoing disclosure and description of the invention are illustrative and explanatory thereof, and various changes in the size, shape, and materials, as well as in the details of the illustrated construction, may be made without departing from the spirit of the invention.

What is claimed is:

1. A pet bed for placement on a support, comprising an elevated platform, said platform supported by an annular ring, said ring extending above and below said platform and in contact with the support surface over a majority of it's length, said ring defining an elongated void volume therein and said ring extending substantially around the periphery of said platform and defining a break which serves as the entrance to said platform.

2. The bed of claim 1, wherein:
said annular ring is sealed.

3. The bed of claim 2, wherein:
said annular ring is air-filled.

4. The bed of claim 2, wherein:
said annular ring contains an insulating material.

5. The bed of claim 1, wherein:
said platform further comprises peripheral openings for use in securing a mat to said platform.

6. The bed of claim 1, further comprising:
a heating or cooling unit mounted to said platform, said platform further comprising inlet and exhaust air passages.

7. The bed of claim 6, wherein:
said annular ring comprises a foot assembly defining at least one break therein, said break forming an access for at least one of said passages out from the underside of said platform.

8. A pet bed having a platform and supported by an annular ring extending substantially around the periphery of the platform, and supporting the platform, said bed comprising;
a heating or cooling unit mounted to said platform further comprising inlet and exhaust air passages; said annular ring comprises a foot assembly defining at least one break therein, said break forming an access for at least one of said passages out from the underside of said platform;
said platform underside is formed to define a part of at least one passage; said heating or cooling unit further comprising a cover which cooperated with the underside of said platform to create at least one exhaust passage; said heating or cooling unit comprising a fan which takes suction through a different break in said foot assembly than said passage which handles exhaust.

9. The bed of claim 8, wherein:
said fan takes suction through said cover and said cover cooperates with said underside of said platform to create at least two exit passages for fan exhaust.

10. The bed of claim 6, wherein:
said heating or cooling unit comprises a thermoelectric unit which forms a portion of said platform.

11. The bed of claim 10, wherein:
said thermoelectric unit further comprises a thermostat.

12. The bed of claim 11, wherein:
said thermostat controls power supply to said thermoelectric unit and said thermostat is capable of switching, said thermoelectric unit between heating and cooling mode.

13. The bed of claim 10, wherein:
said annular ring extends substantially around the periphery of said platform to define the break which serves as the entrance to said platform.

14. The bed of claim 13, wherein:
said annular ring is sealed.
15. The bed of claim 14, wherein:
said annular ring is air-filled.
16. The bed of claim 15, wherein:
said platform further comprises peripheral openings for use in securing a mat to said platform.

17. The bed of claim 6, wherein:
said heating or cooling unit comprises a eutectic material.
18. The bed of claim 17, further comprising:
a powered device to work in conjunction with said eutectic material.

* * * * *

UNITED STATES PATENT AND TRADEMARK OFFICE
CERTIFICATE OF CORRECTION

PATENT NO. : 6,237,531 B1
DATED : May 29, 2001
INVENTOR(S) : Kathleen G. Peeples et al.

It is certified that error appears in the above-identified patent and that said Letters Patent is hereby corrected as shown below:

<u>Title page,</u>
Item [75], please add the inventor:

-- Larry Giles, Houston, TX --

Signed and Sealed this

Thirtieth Day of July, 2002

*Attest:*

*Attesting Officer*

JAMES E. ROGAN
*Director of the United States Patent and Trademark Office*